Feb. 19, 1957  M. GEIGER  2,782,148
PROCESS FOR THE PURIFICATION OF ACRYLIC ACID NITRILE
Filed Dec. 4, 1951
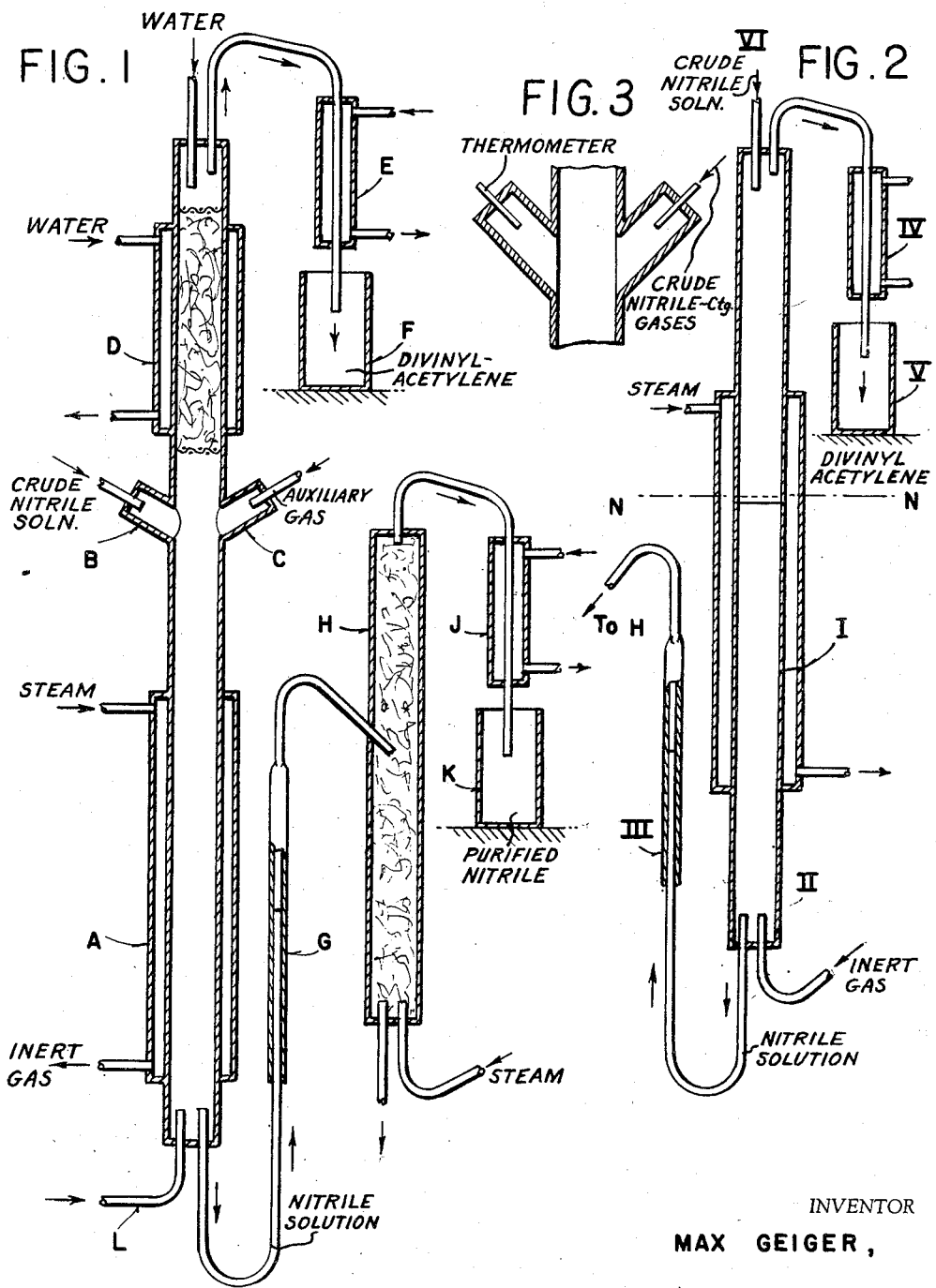
INVENTOR
MAX GEIGER,
BY Henderoth, Lind & Ponack
ATTORNEYS

United States Patent Office 2,782,148
Patented Feb. 19, 1957

2,782,148
PROCESS FOR THE PURIFICATION OF ACRYLIC ACID NITRILE

Max Geiger, Riehen, Switzerland, assignor to Ciba Limited, Basel, Switzerland, a Swiss firm Application December 4, 1951, Serial No. 259,743

Claims priority, application Switzerland June 22, 1951

4 Claims. (Cl. 202—39.5)

It is known that acrylic acid nitrile can be made by the action of acetylene on hydrogen cyanide in the presence of an aqueous cuprous salt catalyst.

In the process carried out in practice the catalyst mixture is heated in a reaction tower at 70–80° C., and acetylene is passed through the hot mixture and hydrocyanic acid is simultaneously introduced dropwise. The acrylic acid nitrile formed is removed from the reaction tower by the current of acetylene and dissolved out of the gas stream by absorption in water, and the excess of acetylene is returned to the reaction tower. The nitrile is obtained in a concentrated form from the dilute aqueous solution, which contains about 1–2% of acrylic acid nitrile, by azeotropic distillation. It is then purified by fractional distillation. This is necessary because considerable quantities of by-products are formed in the synthesis. Among these by-products there may be mentioned monovinyl-acetylene, acetaldehyde, chloroprene, divinyl-acetylene, cyano-butadiene and lactonitrile. The content of these by-products and hydrocyanic acid and acetylene in the crude acrylic acid nitrile is mainly dependent on the conditions under which the synthesis is carried out and on the purity of the starting materials used, especially the purity of the acetylene. By repeated fractional distillation most of the by-products can be separated in the form of fore-runnings or after-runnings. A considerable loss of acrylic acid nitrile is unavoidable. However, it is not possible by simple distillation to separate the divinyl-acetylene. Acrylic acid nitrile which contains divinyl-acetylene, even when the latter is present only in small quantities, is unsuitable for many purposes. Thus, such an acrylic acid nitrile is unsuitable for the production of polymerisation products which are to be worked up into threads.

It is therefore necessary to remove the divinyl-acetylene by other means than distillation. It has already been proposed to subject the pre-purified acrylic acid nitrile to a partial chlorination and to separate the nitrile from the chlorination products by distillation. However, this method has not been used on a large scale, apparently because in the chlorination of divinyl-acetylene a certain amount of the acrylic acid nitrile is always chlorinated. It has also been proposed to prepare from the already highly concentrated acrylic acid nitrile purified by distillation, which still contains divinyl-acetylene, an aqueous solution of 12–15% strength, and to distil the solution fractionally, the first fractions being enriched with divinyl-acetylene. This method is not very satisfactory because large quantities of acrylic acid nitrile must be distilled before the distillate is in some degree free from divinyl-acetylene. Experiments with solutions of 10% strength and 2% strength with the use of a good column have shown that up to 50% of the acrylic acid nitrile must be distilled before the distillate contains only very small amounts of divinyl-acetylene.

The present invention is based on the unexpected observation that acrylic acid nitrile can be purified with only small losses of nitrile by partially evaporating a dilute aqueous solution of acrylic acid nitrile, which contains as by-products divinyl-acetylene, and possibly other compounds, while passing in countercurrent to the vapours evolved water or a dilute solution of acrylic acid nitrile.

By the term "dilute aqueous solution of acrylic acid nitrile" is meant a solution which contains not more than about 5% of acrylic acid nitrile. As such solutions there are advantageously used those which are obtained by introducing the gaseous mixture leaving the reaction tower used for the synthesis of acrylic acid nitrile. These solutions usually contain about 1–2% of acrylic acid nitrile.

The present process may be carried out discontinuously, but is advantageously carried out continuously. In the discontinuous process a distillation vessel, which is provided with a fractionating column filled with filling bodies such as Raschig rings or Berl saddle-shaped bodies, is charged with the crude acrylic acid nitrile solution, and the distillation is commenced by heating to 70–90° C. At the same time water is allowed to trickle through the column, and the water redissolves out of the ascending vapours a large proportion of the acrylic acid nitrile, while the divinylacetylene remains in the form of vapour and is condensed together with water and a little acrylic acid nitrile in an inclined condenser. As soon as divinyl-acetylene can no longer be detected in the condensate, the supply of water to the column is stopped and the acrylic acid nitrile is completely distilled from the solution by introducing steam into the product being distilled and collected in a separate vessel, from which it can be recovered in a pure form by further rectification.

A still more intense fractionation can, according to a modification of the process of the invention, be obtained by diluting the hot steam ascending in the column with an inert gas. In this way it is possible to hold back in the distillation apparatus practically the whole of the acrylic acid nitrile until all the divinyl-acetylene has been removed. As an inert gas there may be used, for example, hydrogen, carbon dioxide, methane, ethane, butane, or acetylene. Preferably, however, nitrogen is used. Obviously mixtures of such gases may be used.

On the accompanying sheet of drawings showing diagrammatically two exemplary embodiments of apparatus for carrying out the present invention:

Fig. 1 is a diagrammatic representation of one form of such apparatus;

Fig. 2 is a diagrammatic representation of a second form of such apparatus; and

Fig. 3 is a modified form of the apparatus according to Fig. 2, and more particularly adapted to the purification of a gaseous mixture containing acrylic acid nitrile.

For carrying out the continuous process, which is preferred, a distillation column capable of being heated is required. The heating apparatus may be such that the column is surrounded by a jacket capable of being heated. Alternatively, a heating coil may be incorporated in the column. Otherwise the column contains no filling bodies. An example of a suitable column is shown diagrammatically in Fig. 2 of the drawings. The column I is provided with a jacket capable of being heated, a supply conduit VI for the crude acrylic acid nitrile solution, an inclined condenser IV for condensing the vapours containing divinyl-acetylene, an outlet conduit III for the hot solution freed from divinyl-acetylene, and a small nozzle II for introducing a small amount of inert gas. The level mark N shows to what height the column should be charged with acrylic acid nitrile solution.

The partial evaporation of the crude acrylic acid nitrile solution in the column is carried out by evaporating a part of the acrylic acid nitrile and the divinyl-acetylene while the solution is being heated up in the heated column, and by redissolving the major part of the evaporated acrylic acid nitrile by means of the solution flowing in countercurrent. It is therefore necessary to start from an acrylic acid nitrile solution which is not saturated with the nitrile.

The temperature limits, which must be maintained for the partial evaporation, are in part dependent on the apparatus used. In general the following approximate temperatures limits may be observed. The lower limit is at 69° C., the boiling point of the azeotropically distilled mixture of water and acrylic acid nitrile, and the upper limit may be 100° C., at which temperature the nitrile is completely expelled from the aqueous solution. The column is preferably so heated that the liquid issuing at III has a temperature of 85–95° C. This can be brought about, for example, in an advantageous manner by heating the jacket with steam. The rate at which the crude nitrile solution is introduced at VI is so adjusted that, on the one hand, the solution will be sufficiently heated to expel the divinyl-acetylene, and, on the other, that the liquid flowing in countercurrent to the vapours has a sufficiently low temperature to dissolve as much acrylic acid nitrile as possible. It has also been found advantageous to charge the column partially with acrylic acid nitrile solution, that is to say, so to regulate the speed of inflow and outflow that a part of the column is charged with hot solution. If the column became empty, or if it were filled with filling bodies, and the inflow and outflow speeds were so adjusted that the column could not be filled with liquid, the process would have to be interrupted after a short time, because fine films of water-repellent polymerisates would form on the walls of the column and on the filling bodies, which films would impair heat transference. By partially filling the column with hot solution this difficulty can be avoided. In order to avoid boiling with bumping in the liquid a small amount of inert gas such as nitrogen is blown in through the nozzle II. In this continuous process the divinyl-acetylene can be removed from the crude acrylic acid nitrile solution, and only about 10–15% of the nitrile present are distilled, that is to say, that about 90% of the nitrile can be obtained free from divinyl-acetylene. The loss in acrylic acid nitrile can be reduced also in the continuous process by diluting the ascending hot vapours with an inert gas and causing water to flow in countercurrent to the dilute gaseous mixture in a second column, as in the embodiment of Fig. 1. The second column, which is charged with filling bodies, may be separate from the first column, but it is advantageous to place it on top of the first column so that the downwardly flowing water can flow directly into the first column. In carrying out this form of the process it is necessary to take account of one matter, namely the temperature of the vapours which are diluted with the inert gas. The temperature of the gaseous mixture should not be substantially below 60° C., because otherwise the divinyl-acetylene and acrylic acid nitrile condense too strongly. The quantity of the inert gas to be added depends mainly on the quantity of divinyl-acetylene present in the vapours, and the quantity of the water on the quantity of acrylic acid nitrile present in the gaseous mixture. The temperature of the flowing water and the temperature in the extraction column is adjusted advantageously at about 30–40° C. Under such conditions it is possible to wash out the acrylic acid nitrile completely, while the divinyl-acetylene escapes in the form of vapour. As inert gases there are suitable those which have been mentioned above. Instead of an inert gas there may be used an organic solvent immiscible with water, and which boils below 80° C. Especially suitable are aliphatic hydrocarbons, such as pentane, hexane, or a mixture of these hydrocarbons. When such liquids are added they evaporate in the hot vapour mixture of divinyl-acetylene and acrylic acid nitrile and play the part of an inert gas.

The substances used as inert gas and which contain the easily volatile impurities may, after suitable purification, either be recycled for the process of the invention or serve other purposes. Nitrogen and hydrocarbons may for instance, without having been purified, advantageously be introduced into an electric arc furnace for the production of acetylene. If acetylene is used as inert gas it can after purification by adsorption or intensive cooling again be used in the process of the synthesis of acrylic acid nitrile.

The acrylic acid nitrile solution freed from divinyl-acetylene is worked up by methods in themselves known by a complete evaporation of the aqueous solution followed by fractional distillation.

It has also been found that the purification process of the invention can be modified by using as the starting material, instead of the crude aqueous acrylic acid nitrile solution, the gaseous mixture which issues from the reaction tower used in the synthesis of acrylic acid nitrile. For carrying out this preferred form of the process, in addition to the change shown in Fig. 3, the short extraction column D shown in Fig. 1 is replaced by a considerably larger one, in which the whole of the amount of acrylic acid nitrile formed in the synthesis must be absorbed from the whole of the circulating gas by means of water flowing in countercurrent thereto. This extraction column replaces principally the usual column hitherto used in the known processes for extracting acrylic acid nitrile from the gaseous reaction mixture. However, it also has the function of washing the acrylic acid nitrile out of the vapours ascending from the distillation column A, the easily volatile hydrophobic substances, especially divinyl-acetylene, being carried along with the circulating gas. In this manner the dilute acrylic acid nitrile solution issuing from the bottom of the distillation column A can be obtained completely free from divinyl-acetylene. Moreover it is possible to return practically completely to the circulating gas the considerable amounts of acetylene dissolved in the crude acrylic acid nitrile solution of 2% strength which have hitherto been lost in working up. It is surprising that the return of the volatile impurities, especially the divinyl-acetylene, to the circulating gas causes no substantial increase in the content of the gas of these undesired by-products, as the portion of these impurities hitherto passing into the washing water in the known processes represents only a small fraction of the quantity remaining in the circulating gas. By the normal purification by absorption or intense cooling the content of harmful impurities in the circulating gas can easily be kept under control.

The process of the invention is carried out at atmospheric pressure, but it may also be carried out at a slightly increased or slightly reduced pressure in which cases the temperatures to be applied differ of course somewhat from those indicated above.

While the process of the invention is herein explained with reference to diagrams of the apparatus, it is obvious that the process is not confined to this apparatus. The invention is based on the observation that it is possible to remove divinyl-acetylene from crude acrylic acid nitrile solutions by the fractional distillation of such solutions and the simultaneous selective extraction of the vapors without loss of nitrile. Accordingly, any apparatus which enables a distillation-extraction process to be carried out can be used in the invention.

The following examples illustrate the invention.

*Example 1*

The apparatus used for purifying crude acrylic acid nitrile solution in this example is that shown diagrammatically in Fig. 2, and consists of a Vigreux column J having an internal diameter of 2.5 cm. and a length of 60 cm. Upon this is placed a tube of similar width having a length of 30 cm. to the upper end of which the acrylic acid nitrile solution to be purified is supplied and from which the vapours formed in the apparatus can issue, the vapours being condensed in an inclined condenser IV. The jacket of the column is heated with steam introduced at the upper connection, and the condensed water and excess of steam escape from the lower connection. At the lower end of the column a continuous stream of an inert gas is blown in at the rate of about 1 liter per hour through a capillary II to cause uniform distillation. The acrylic acid nitrile solution likewise escaping from the lower end of the column is passed into the evaporation column H through a syphon III which is adjustable in height.

When a current of acrylic acid nitrile solution of 2% strength is caused to flow at 30° C. into the column at the rate of 5 liters per hour, brisk boiling sets in. The vapours of nitrile and easily volatile accompanying substances which are expelled, ascend and give up a part of the acrylic acid nitrile to the dilute aqueous solution flowing in countercurrent. The easily volatile hydrophobic accompanying substances, on the other hand, are no longer dissolved in appreciable quantities and leave the column with a portion of the nitrile in the form of vapour at a temperature of about 60° C., to be condensed in the inclined condenser IV and collected in the receiver V. Accordingly, all the divinyl-acetylene is distilled off as fore-runnings with a quantity of acrylic acid nitrile corresponding to 10–20% of the total nitrile present in the aqueous solution introduced. The acrylic acid nitrile solution so purified, representing 80–90% of the original content of nitrile, leaves the lower end of the column and flows through the syphon III into the evaporation column H, where all the nitrile and all the steam-distillable accompanying substances are distilled with steam. The vapours are condensed in the condenser J and the nitrile separates as an upper layer in the receiver K (see Figure 1). This nitrile after a single fractionation has a very high degree of purity, and in particular it is quite free from divinyl-acetylene.

Example 2

The apparatus used for purifying crude acrylic acid nitrile solution according to this example is shown diagrammatically in Fig. 1 and consists essentially of two parts, namely the distillation column A constructed as a Vigreux column having an internal diameter of 2.5 cm. and a length of 60 cm., on which is placed a tube of the same diameter having a length of 30 cm. and provided with two lateral inlet connections B and C, and an extraction column D which takes the form of a tube having an internal diameter of 2.5 cm. and a length of 40 cm. and charged with Berl saddle-shaped bodies of 0.5 cm. The jacket of the distillation column A is heated with steam at 100° C., and water is circulated through the jacket of the extraction column D at 30–40° C. At the lower end of the column A a current of inert gas is continuously introduced at the rate of 1–2 liters per hour into the distillation space through a capillary L, in order to prevent boiling with bumping, while the issuing liquid is passed through a syphon adjustable in height into the evaporation column H directly heated with steam.

The purification of the crude acrylic acid nitrile solution to free it from easily volatile impurities, especially divinyl-acetylene, is carried out in the following manner:

A continuous current of an aqueous solution containing about 2% of acrylic acid nitrile is introduced at the rate of 5–10 liters per hour through the opening B, the solution being preheated to 50–60° C. The column A indirectly heated with steam then becomes charged with this solution, which boils briskly after a short time. A part of the acrylic acid nitrile dissolved therein and all the easily volatile hydrophobic accompanying substances are driven out by evaporation. The vapours rise in counter-current to the stream of the dilute aqueous solution and even at this stage give up a part of their nitrile content to the solution. When the vapours reach the space at B and C, they become diluted by the gas stream introduced at C at the rate of 10–30 liters per hour (nitrogen, methane, ethane, ethylene, acetylene, propane, butane, etc.) and passed on into the extraction column D. In the extraction colum D the water at 30–40° C. and ⅕ to 1/20 of the amount of nitrile solution introduced at B flow in countercurrent to the gaseous mixture. In this manner the acrylic acid nitrile contained in the gas is dissolved and returned to the distillation column A. The easily volatile hydrophobic substances, on the other hand, remain in gaseous form and leave the apparatus at a temperature of about 35° C. They are cooled in the inclined condenser E and may be condensed in an intensively cooled vessel. The condensate contains at most traces of the acrylic acid nitrile.

The aqueous nitrile solution leaves the distillation column at the lower end thereof at a temperature of 85–95° C. and flows through the syphon G into the evaporation column, where the nitrile and the whole of the steam-distillable by-products are driven out by the steam flowing in counter-current. The vapours are condensed in J and collected in the receiver K. The nitrile, which no longer contains any divinyl-acetylene, can be separated as an upper layer. By fractionating the nitrile worked up in this manner it can be obtained in a very high state of purity.

Example 3

In the apparatus described in Example 2 is fractionated a continuous stream of a crude aqueous acrylic acid nitrile solution of 2% strength pre-heated to 60° C. and introduced at the rate of 8 liters per hour. Instead of the auxiliary gas, hexane is introduced dropwise at C at a uniform rate of 50 grams per hour in order to dilute the easily volatile accompanying substances and to carry the latter into the extraction column. The hexane evaporates immediately as the temperature in the pipe connecting A and D is about 70° C. The hexane vapour serves the function of a carrier for small amounts of the easily volatile accompanying substances, while the acrylic acid nitrile introduced into the extraction column is dissolved out by the water heated at 50–60° C. flowing in countercurrent. In order to avoid condensing the hexane vapours the jacket of the extraction column must be heated at 60° C. The vapours containing all the divinyl-acetylene leave the upper end of the column, and are condensed in the condenser E and collected in the receiver F. The condensate contains practically no acrylic acid nitrile. The purified aqueous nitrile solution leaves the column A as in Example 2 and is worked up to pure nitrile in an analogous manner. It no longer contains any divinyl-acetylene.

Example 4

In the apparatus described in Example 2 for purifying the crude acrylic acid nitrile solution the extraction column D having an internal diameter of 2.5 cm. and a length of 40 cm. is replaced by a glass tube having an internal diameter of 4.0 cm. and a length of 2.8 meters and filled with Berl saddle-shaped bodies of 5 mm. A thermometer is inserted at B and the opening is closed (see Fig. 3). The gaseous mixture issuing from the synthesis tower at the rate of 500 liters per hour is introduced at C (Fig. 3) without being cooled, and, as the distillation column A is filled to the extent of about ⅔ with nitrile solution, flows through the extraction column D, whereby all the nitrile is absorbed by the trickling water (about 3–5 liters per hour). The resulting acrylic acid nitrile solution of about 2–3% strength passes into the distillation column A, of which the jacket is heated with steam, and in which brisk boiling occurs. A part of the nitrile is evaporated and rises together with the easily volatile impurities, especially divinyl-acetylene, in counter-current to the stream of the dilute solution of acrylic acid nitrile. When B and C are reached the greater part of the acrylic acid nitrile has been dissolved by the nitrile solution flowing out of the extraction column and flows again through the distillation column. The substances remaining in the form of vapour, such as the remainder of the acrylic acid nitrile, and especially the divinylacetylene, are carried along with the gas stream at C and again passed into the extraction column. The gaseous mixture issuing from the upper end of the extraction column is practically free from acrylic acid nitrile and is again led into the synthesis tower. In order to ensure continuous boiling in the distillation column a constant stream of pure acetylene is introduced through the capillaries L at the rate of about 1 liter per hour. As compared with the use of nitrogen this has the advantage that the circulating gas is not unnecessarily diluted with inert gas.

The oil layer which sometimes separates in the distillation column and then floats on the aqueous acrylic acid nitrile solution and which consists mainly of cyanobutadiene may cause trouble owing to the formation of polymerisation products which form a layer of dirt and resinous incrustation on the heating surface. This drawback can be met by adding a small quantity of a specifically heavy, high-boiling oil, for example a mixture of chlorinated benzenes. The floating organic layer is thus rendered specifically heavier than water and it is removed in the form of fine drops together with the acrylic acid nitrile solution flowing out, whereupon it can be separated from the aqueous solution by means of a separating device. The aqueous acrylic acid nitrile solution issuing from the lower end of the distillation column is worked up to pure acrylic acid nitrile as described in Example 2.

What is claimed is:

1. In the process of purification of acrylic acid nitrile by removing divinylacetylene which is performed by the use of a gaseous mixture containing at least acrylic acid nitrile and divinylacetylene in dilute form as starting material and is conducted in a continuous manner, the steps which comprise introducing the gaseous mixture which is derived from the reaction tower used for the synthesis of acrylic acid nitrile and contains at least acrylonitrile and divinylacetylene into the upper part of a heated distillation column, the lower part of which is charged with a dilute solution of acrylic acid nitrile throughout the whole process, causing to flow water through an extraction column placed on the top of said distillation column, in countercurrent to the gaseous mixture in order to extract acrylic acid nitrile therefrom, and heating the said dilute solution of acrylic acid nitrile in the lower part of the distillation column in order to evaporate the divinylacetylene, other easily volatile compounds and a part of the acrylic acid nitrile, the solution flowing out of the lower end of the distillation column being free from divinylacetylene and the divinylacetylene escaping at the top of the extraction column in vapor form.

2. In the process of purification of acrylic acid nitrile by removing divinylacetylene which is performed by the use of a gaseous mixture containing at least acrylic acid nitrile and divinylacetylene in dilute form as starting material and is conducted in a continuous manner, the steps which comprises introducing the gaseous mixture which is derived from the reaction tower used for the synthesis of acrylic acid nitrile and contains at least acrylonitrile and divinylacetylene into the upper part of a heated distillation column, the lower part of which is charged with a dilute solution of acrylic acid nitrile throughout the whole process, causing to flow water through an extraction column placed on the top of said distillation column, in countercurrent to the gaseous mixture in order to extract acrylic acid nitrile therefrom, and heating the said dilute solution of acrylic acid nitrile in the lower part of the distillation column in order to evaporate the divinylacetylene, other easily volatile compounds and a part of the acrylic acid nitrile, the solution flowing out of the lower end of the distillation column being free from divinylacetylene and issuing at a temperature of 85–95° C., and the divinylacetylene escaping at the top of the extraction column in vapor form.

3. In the process of purification of acrylic acid nitrile by removing divinylacetylene which is performed by the use of a gaseous mixture containing at least acrylic acid nitrile and divinylacetylene in dilute form as starting material and is conducted in a continuous manner, the steps which comprise introducing the gaseous mixture which is derived from the reaction tower used for the synthesis of acrylic acid nitrile and contains at least acrylonitrile and divinylacetylene into the upper part of a heated distillation column, the lower part of which is charged with a dilute solution of acrylic acid nitrile throughout the whole process, causing to flow water through an extraction column placed on the top of said distillation column, in countercurrent to the gaseous mixture in order to extract acrylic acid nitrile therefrom, and heating the said dilute solution of acrylic acid nitrile in the lower part of the distillation column in order to evaporate the divinylacetylene, other easily volatile compounds and a part of the acrylic acid nitrile, the solution flowing out of the lower end of the distillation column being free from divinylacetylene and issuing at a temperature of 85–95° C., and the gaseous mixture which is free from acrylic acid nitrile contains the divinylacetylene and escapes at the top of said extraction column being recycled into the synthesis of acrylic acid nitrile.

4. In the process of purification of acrylic acid nitrile by removing divinylacetylene which is performed by the use of a gaseous mixture containing at least acrylic acid nitrile and divinylacetylene in dilute form as starting material and is conducted in a continuous manner, the steps which comprise introducing the gaseous mixture which is derived from the reaction tower used for the synthesis of acrylic acid nitrile and contains at least acrylonitrile and divinylacetylene into the upper part of a heated distillation column, the lower part of which is charged with a dilute solution of acrylic acid nitrile throughout the whole process, causing to flow water through an extraction column placed on the top of said distillation column, in countercurrent to the gaseous mixture in order to extract acrylic acid nitrile therefrom, and heating the said dilute solution of acrylic acid nitrile in the lower part of the distillation column in order to evaporate the divinylacetylene, other easily volatile compounds and a part of the acrylic acid nitrile, the solution flowing out of the lower end of the distillation column being free from divinylacetylene and issuing at a temperature of 85–95° C. and the divinylacetylene escaping at the top of the extraction column in vapor form, and which process further comprises choosing the dimensions of the extraction column and distillation column so that at a rate of circulation of the gas amounting to 500 liters per hour the supply of water at the rate of about 3–5 liters per hour suffices to wash out all the acrylic acid nitrile in the form of a solution of about 2 percent.

References Cited in the file of this patent

UNITED STATES PATENTS

| | | |
|---|---|---|
| 2,462,013 | Waterman | Feb. 15, 1949 |
| 2,526,676 | Lovett | Oct. 24, 1950 |
| 2,551,593 | Gilliland et al. | May 8, 1951 |
| 2,551,625 | Morrell et al. | May 8, 1951 |
| 2,649,472 | Lovett | Aug. 28, 1953 |

OTHER REFERENCES

"Manufacture of Acrylonitrile by Addition of Hydrocyanic Acid to Acetylene," FIAT Final Report 1125, Office of Military Government for Germany (U. S.), May 23, 1947, pages 9, 10, 11, 17 and 18.